(12) United States Patent
Haselhorst et al.

(10) Patent No.: US 9,469,344 B2
(45) Date of Patent: Oct. 18, 2016

(54) SUBFRAME FOR A MOTOR VEHICLE, IN PARTICULAR A FRONT AXLE SUBFRAME, AND BODYWORK COMPRISING SUCH A SUBFRAME

(71) Applicant: Autotech Engineering Deutschland GmbH, Bielefeld (DE)

(72) Inventors: Kai Haselhorst, Versmold (DE); Viktor Friesen, Bielefeld (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 0 days.

(21) Appl. No.: 14/602,483

(22) Filed: Jan. 22, 2015

(65) Prior Publication Data

US 2015/0217808 A1    Aug. 6, 2015

(30) Foreign Application Priority Data

Feb. 3, 2014   (EP) .................................. 14153651

(51) Int. Cl.
 *B62D 21/00* (2006.01)
 *B62D 21/11* (2006.01)

(52) U.S. Cl.
 CPC .................. *B62D 21/11* (2013.01)

(58) Field of Classification Search
 CPC  B62D 21/11; B62D 29/008; B60G 21/0551; B60G 2204/1222
 USPC ........... 180/312; 280/124.109, 788; 411/145, 411/163, 240, 451.3
 See application file for complete search history.

(56) References Cited

U.S. PATENT DOCUMENTS

| 1,391,378 | A | * | 9/1921 | Gaston | ..................... F16B 39/24 411/147 |
| 3,584,857 | A | * | 6/1971 | Hipsher | ..................... F16F 1/38 267/281 |

(Continued)

FOREIGN PATENT DOCUMENTS

| DE | 102005035995 A1 | 2/2007 |
| DE | 102006058993 A1 | 6/2008 |

(Continued)

*Primary Examiner* — James English
(74) *Attorney, Agent, or Firm* — The Webb Law Firm

(57) ABSTRACT

The invention relates to a subframe for a motor vehicle, in particular a front axle subframe, including a first shell element and a second shell element which is rigidly connected to the first shell element and defines a cavity therewith, and at least one bodywork connection sleeve for inserting a screw therethrough. The bodywork connection sleeve is attached at one of its ends to a through-hole in the first shell element and extends within the cavity towards a through-hole in the second shell element. So that such a subframe can be easily mounted and can provide a high level of security against slipping relative to the bodywork, the invention provides that an annular disc is allocated to the attached end of the bodywork connection sleeve, which disc projects radially relative to the outer surface of the sleeve, is arranged on the outside of the first shell element and is integrally bonded thereto, and that a toothed disc produced separately from the bodywork connection sleeve is arranged on the outside on the through-hole in the second shell element, which the other end of the bodywork connection sleeve faces, which toothed disc has an external diameter which is greater than the internal diameter of the through-hole in the second shell element, and is integrally bonded to the second shell element.

15 Claims, 5 Drawing Sheets

(56) References Cited

U.S. PATENT DOCUMENTS

| | | | | |
|---|---|---|---|---|
| 5,567,005 | A * | 10/1996 | Kosuge | B62D 21/02 296/204 |
| 5,580,028 | A * | 12/1996 | Tomczak | B60G 99/004 248/632 |
| 7,380,829 | B2 * | 6/2008 | Kishima | B62D 21/155 180/232 |
| 8,465,010 | B2 * | 6/2013 | Kuki | F16F 1/3863 267/141.2 |
| 8,523,258 | B2 * | 9/2013 | Ohhama | B62D 21/11 180/299 |
| 8,746,718 | B2 * | 6/2014 | Otani | B60G 7/02 280/124.109 |
| 2004/0046381 | A1 * | 3/2004 | Yoshida | B60G 99/00 280/784 |
| 2005/0046215 | A1 * | 3/2005 | Chung | F16F 1/3814 296/29 |
| 2005/0212334 | A1 * | 9/2005 | Murata | B62D 21/11 296/204 |
| 2006/0049603 | A1 * | 3/2006 | Katagiri | B60G 7/02 280/124.109 |
| 2007/0273179 | A1 | 11/2007 | Hommel et al. | |
| 2007/0278778 | A1 | 12/2007 | Tanaka et al. | |
| 2010/0102543 | A1 * | 4/2010 | Kang | B62D 21/11 280/784 |
| 2012/0286543 | A1 * | 11/2012 | Lee, III | B62D 21/11 296/204 |
| 2015/0375788 | A1 * | 12/2015 | Yun | B60K 5/1216 267/292 |

FOREIGN PATENT DOCUMENTS

| | | |
|---|---|---|
| DE | 102009034860 A1 | 4/2010 |
| FR | 2872481 A1 | 1/2006 |
| WO | 2005075281 A1 | 8/2005 |

\* cited by examiner

SUBFRAME FOR A MOTOR VEHICLE, IN PARTICULAR A FRONT AXLE SUBFRAME, AND BODYWORK COMPRISING SUCH A SUBFRAME

CROSS-REFERENCE TO RELATED APPLICATION

This application claims priority to European Patent Application No. 14153651.6 filed Feb. 3, 2014, the disclosure of which is hereby incorporated in its entirety by reference.

BACKGROUND OF THE INVENTION

1. Field of the Invention

The invention relates to a subframe for a motor vehicle, in particular a front axle subframe, comprising a first shell element and a second shell element which is rigidly connected to the first shell element and defines a cavity therewith, and comprising at least one bodywork connection sleeve for inserting a screw therethrough, the bodywork connection sleeve being attached at one of its ends to a through-hole in the first shell element and extending within the cavity towards a through-hole in the second shell element.

The invention further relates to bodywork for a motor vehicle comprising such a subframe.

2. Description of Related Art

Known front axle subframes for motor vehicles are composed of shell elements and have bodywork connection points via which they are rigidly connected to bodywork-side longitudinal beams by means of screws. For this purpose, each bodywork connection point is usually provided with a single-piece bodywork connection sleeve (spacer sleeve), which is welded to the subframe or is loosely inserted into a cavity defined by one or two shell elements of the subframe only during mounting on the subframe (cf. DE 10 2006 058 993 A1).

Since, owing to the design, the bore diameters of the bodywork connection sleeves are greater than the external diameters of the inserted screws, it is possible for the front axle subframe to slip relative to the bodywork. Screw play in the bodywork connection sleeves is desired in order to ensure relatively simple bodywork assembly if manufacturing tolerances are exceeded.

On the other hand, the front axle subframe needs to be prevented from slipping relative to the bodywork, since, when accelerating and braking, the forces from the wheel contact point, that is to say the point at which the central plane of the wheel intersects with the plane of the road, are transmitted to the bodywork. In this context, in particular in the case of powerful vehicles and electric-motor-driven vehicles, which have high torques owing to the regenerative braking thereof, there is the risk that the bodywork will begin to float. In extreme cases, this floating may lead to the failure of a component owing to the dynamic load.

SUMMARY OF THE INVENTION

The problem addressed by the present invention is that of providing a subframe of the type mentioned at the outset which can be easily mounted and provides a high level of security against slipping relative to the bodywork.

The subframe according to the invention is characterised in that an annular disc is allocated to the attached end of the bodywork connection sleeve, which disc projects radially relative to the outer surface of the sleeve, is arranged on the outside of the first shell element and is integrally bonded thereto, and furthermore in that a toothed disc produced separately from the bodywork connection sleeve is arranged on the outside on the through-hole in the second shell element, which the other end of the bodywork connection sleeve faces, which toothed disc has an external diameter which is greater than the internal diameter of the through-hole in the second shell element, and is integrally bonded to the second shell element.

The solution according to the invention in particular provides the advantage that the bodywork connection sleeve, the annular disc and the annular toothed disc that is produced separately therefrom can be designed optimally with respect to the desired non-slip connection of the subframe to the bodywork at relatively favourable production costs, without excessively increasing the component weight of the bodywork connection. The toothed structure (toothing) of the toothed disc increases the coefficient of friction between the subframe and the connected bodywork, and thus contributes to the non-slip connection of the subframe. Preferably, the annular disc allocated to the attached end of the bodywork connection sleeve also has a toothed front side.

In particular, the toothed disc can be produced as a separate element so as to save material and processing time. This is particularly applicable if the external diameter of the toothed disc is selected to be significantly greater at least on its toothed front side or top side than the external diameter of the disc allocated to the attached end of the bodywork connection sleeve on its front side which faces away from the bodywork connection sleeve. In this respect, a plurality of diameter variations or diameter ratios between the external diameter of the toothed disc and the external diameter of the other disc are possible. Furthermore, the solution according to the invention makes it possible to produce the toothed disc and the bodywork connection sleeve from different materials, in particular materials of different hardnesses.

An advantageous embodiment of the subframe according to the invention is characterised in that the separately produced toothed disc is made of a harder material, preferably steel, than the material, in particular steel, of the bodywork connection sleeve and/or of the other annular disc. This embodiment ensures that bodywork parts made of high-strength and ultra-high-strength steel alloys, for example of dual-phase steel DP 550 or DP 600, can also be reliably and permanently connected to the subframe. High-strength and ultra-high-strength steels such as DP 550 or DP 600 are distinguished by a low weight while having high strength and good weldability.

A further advantageous embodiment of the subframe according to the invention is characterised in that the separately produced toothed disc, which is integrally bonded to the allocated shell element of the subframe, preferably by means of a welded joint, has an external diameter that is at least 1.4 times, preferably at least 1.5 times, greater than the smallest external diameter of the outer surface of the sleeve. If the toothed disc has a large external diameter, a weld seam having a comparatively large diameter can be produced, which has higher strength compared with weld seams having smaller diameters.

According to a further advantageous embodiment of the invention, the separately produced toothed disc comprises an attachment flange which abuts the second shell element and defines a shoulder that surrounds the toothed top side or front side of the toothed disc. This shoulder, which preferably comprises a round groove, causes a reduction in stresses which may occur at a weld seam between the toothed disc and the shell element. The fatigue limit of the welded joint between the toothed disc and the shell element is thus improved. In this context, it is advantageous for the attachment flange of the toothed disc to have an external diameter which is for example at least 1.1 times, preferably at least 1.2 times, greater than the smallest external diameter of the toothed disc.

In order to (also) minimise the stresses arising on a welded joint between the annular disc allocated to the attached end of the bodywork connection sleeve and the welded-on shell element, it is provided according to a further embodiment of the invention that the annular disc comprises an attachment flange which abuts the first shell element and defines a shoulder that surrounds the front side of the annular disc. In this case, the attachment flange has an external diameter that is at least 1.4 times, preferably at least 1.5 times, greater than the smallest external diameter of the bodywork connection sleeve.

A further preferred embodiment of the invention provides that by tightening the screw that can be inserted into the bodywork connection sleeve, the second shell element can be clamped between the separately produced toothed disc and the bodywork connection sleeve. This embodiment contributes to relieving the load on the weld seam on the toothed disc; however, it is also possible to enlarge the through-hole in the second shell element to the extent that the bodywork connection sleeve directly contacts the toothed disc.

The annular disc allocated to the attached end of the bodywork connection sleeve may also be produced separately from the bodywork connection sleeve. In particular, said disc may be integrally bonded to the end of the bodywork connection sleeve. The annular disc may thus also be referred to as a flange. Alternatively, however, the disc (flange) may also be formed in one piece with the bodywork connection sleeve. In this case, the bodywork connection sleeve and the disc/flange may be made of a single workpiece, for example milled therefrom. The disc/flange may be referred to as the head of the bodywork connection sleeve.

In particular for the purpose of reducing weight and for the purpose of cost-effective manufacture, the subframe according to the invention is, in a preferred embodiment, composed of a lower shell and an upper shell that is rigidly connected thereto. The lower shell and the upper shell are preferably made from sheet steel. The above-mentioned first shell element is preferably the lower shell, with the upper shell then consisting of the above-mentioned second shell element. However, the first shell element and the second shell element of the subframe according to the invention may also be the legs of a single-piece shaped sheet metal part, for example the legs of a shaped sheet metal part which has a substantially U-shaped cross-sectional profile.

Furthermore, the above-stated problem is solved by bodywork which is equipped with a subframe according to the invention and characterised in that the separately produced toothed disc has a greater hardness than the portion of the bodywork connected thereto, and/or in that the annular disc allocated to the attached end of the bodywork connection sleeve has a greater hardness than a bodywork panel connected thereto.

BRIEF DESCRIPTION OF THE DRAWINGS

The invention will be explained in greater detail in the following with reference to drawings which show several embodiments and in which.

DETAILED DESCRIPTION OF THE INVENTION

Figure 1:
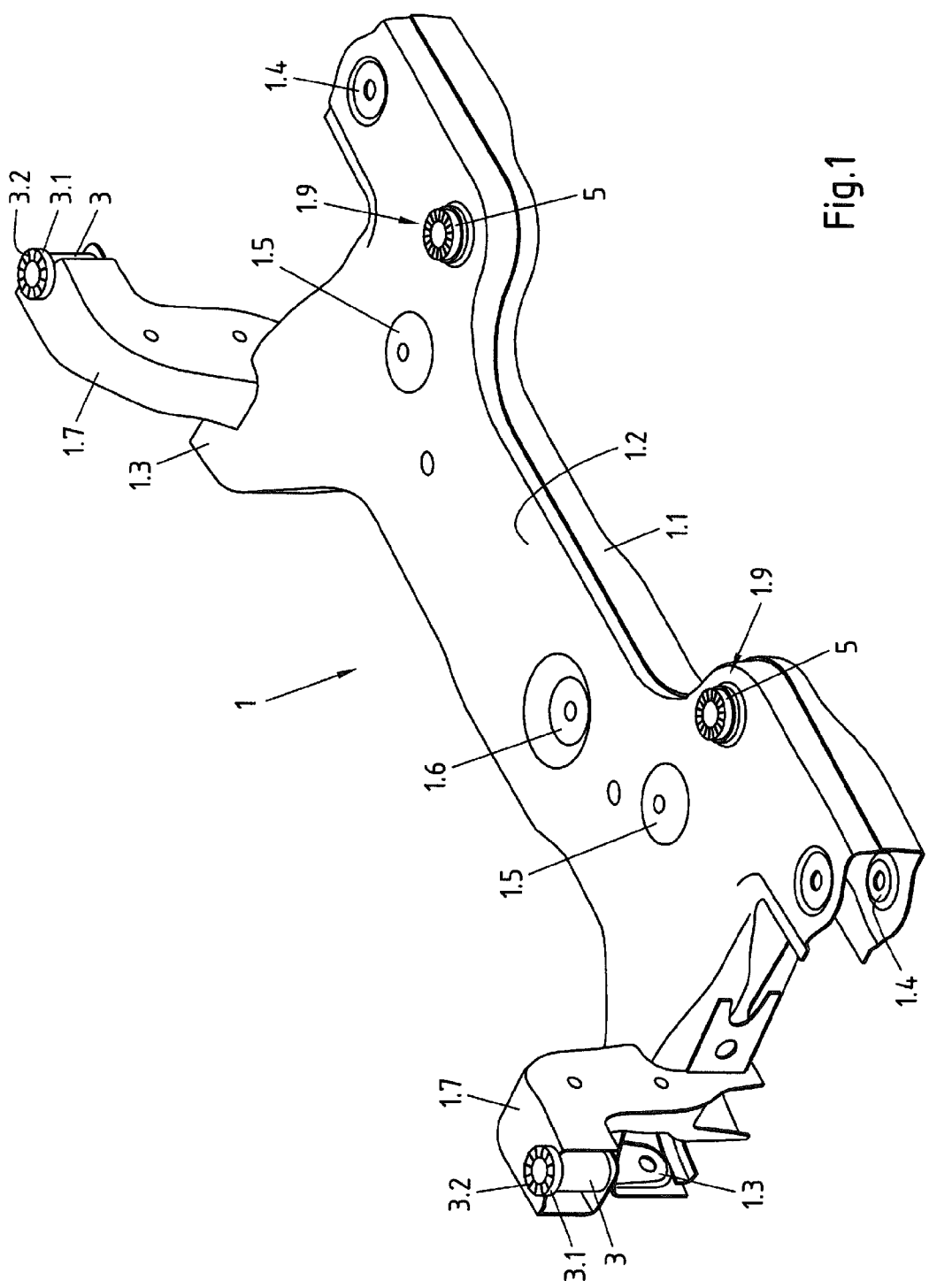
FIG. 1 is a perspective view of a front axle subframe.

The shaped part 1 shown in FIG. 1 is a front axle subframe for a motor vehicle. The subframe 1 is constructed in a shell design. It is composed of a first shell element 1.1 and a second shell element 1.2 which are welded to each other and define a cavity 2. In the embodiment shown, the first shell element 1.1 may also be referred to as the lower shell and the second shell element 1.2 may also be referred to as the upper shell. The edges of the lower shell 1.1 and the upper shell 1.2 are joined to one another with a lap joint, for example.

Connection points 1.3, 1.4 for receiving bodywork-side bearing elements (for example rubber bearing bushes) of a left-hand and a right-hand transverse link (not shown) of a wheel suspension are formed on the transverse sides of the subframe 1. Furthermore, the upper shell 1.2 comprises base-shaped embossed portions 1.5, which are provided with fastening means or screw holes for rigidly connecting a steering gear housing (not shown). Furthermore, a support point 1.6 for an engine roll restrictor is formed in a portion of the subframe 1 acting as a crossmember.

The subframe 1 is rigidly connected to the bodywork of the motor vehicle. For this purpose, support arms (brackets) 1.7 are welded to the upper shell 1.2 and the lower shell 1.1 and are formed from sheet-metal shells that are welded to one another. Connection bushes (connection sleeves) 3 for inserting screws therethrough are fastened, preferably welded, to the ends of the support arms 1.7. The connection bushes 3 define front bodywork connection points. They each comprise a flange-shaped head 3.1 which has a toothed structure (toothing) 3.2 on its front side (top side). Furthermore, the subframe 1 is provided with rear bodywork connection points 1.9 for inserting screws therethrough.

Figure 2:
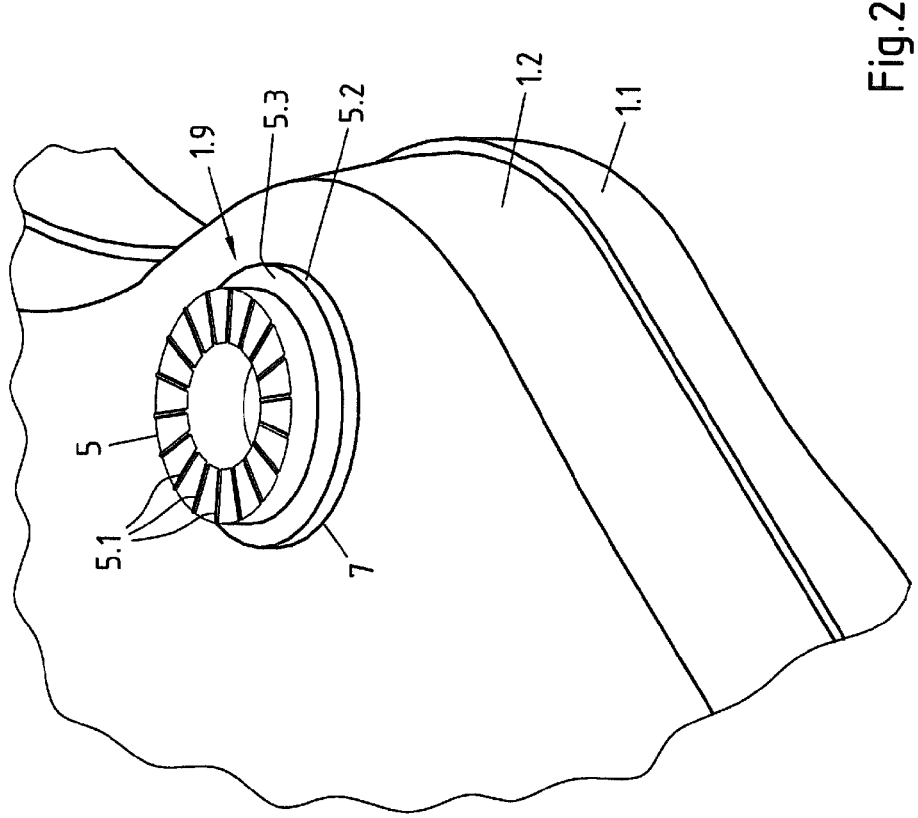
FIG. 2 is an enlarged perspective view of a portion of the front axle subframe from FIG. 1 comprising a rear bodywork connection point.
Figure 3:
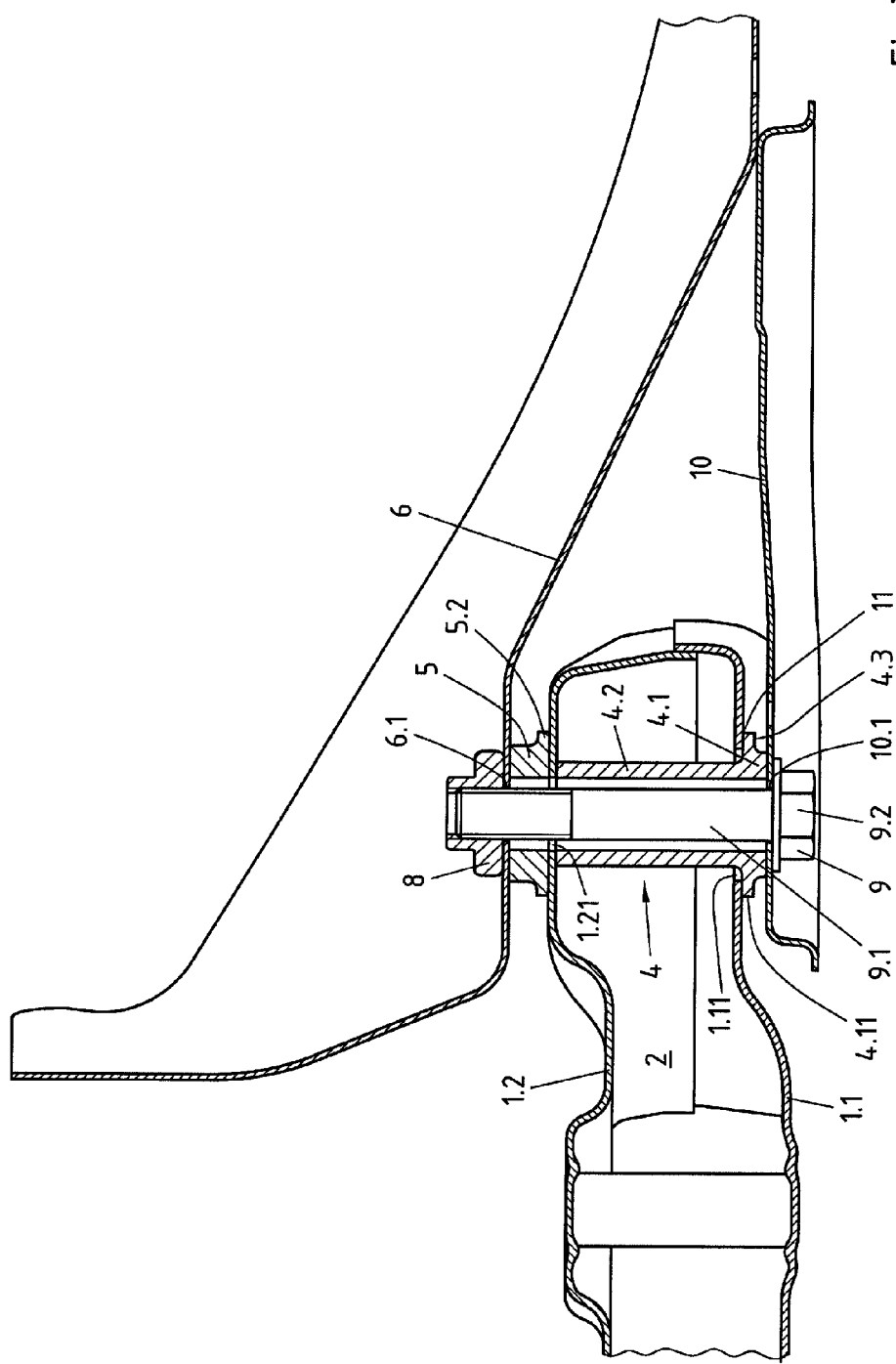
FIG. 3 is a vertical sectional view of a portion of the front axle subframe from FIG. 1, connected to a longitudinal beam of the bodywork and to a metal support sheet.

The structure of one of these rear bodywork connection points 1.9 is best seen from FIGS. 2 and 3.

The lower shell 1.1 has a through-hole 1.11, designed as a drilled hole or cut-out, for receiving a bodywork connection sleeve 4. The sleeve 4 comprises a disc 4.1 which projects radially with respect to the outer surface of the sleeve and may also be referred to as a flange or annular head. The head (flange) 4.1 is preferably formed in one piece with the bodywork connection sleeve 4. In this case, the sleeve 4 and the head 4.1 may be milled together from a single metal workpiece, preferably made of steel material. It is, however, also possible to manufacture the head (flange)

4.1 and the sleeve 4 separately from each other and to then rigidly interconnect them, for example to weld them together. In both cases, the diameter of the through-hole 1.11 in the lower shell 1.1 is dimensioned such that the bodywork connection sleeve 4 can be inserted into the through-hole 1.11 with play and the radially projecting head 4.1 of the inserted sleeve 4 abuts the edge of the through-hole 1.11 on the outside (underside) of the lower shell 1.1.

The upper shell 1.2 also comprises a through-hole 1.21 designed as a drilled hole or cut-out. The through-hole 1.21 is opposite the through-hole 1.11 in the lower shell 1.1 and is flush therewith. In the embodiment shown, the diameter of the through-hole 1.21 in the upper shell 1.2 is smaller than the external diameter of the sleeve portion 4.2 arranged in the cavity. The diameter of the through-hole 1.21 in the upper shell 1.2 corresponds to the internal diameter of the cylindrical sleeve portion 4.2 or is slightly smaller than said diameter. The length of the bodywork connection sleeve 4 is dimensioned such that it abuts the edge of the through-hole 1.21 on the inside of the upper shell 1.2 when the subframe 1 is mounted.

On the through-hole 1.21, an annular toothed disc 5 is integrally bonded, preferably welded, to the outside of the upper shell 1.2. The front side of the toothed disc 5, which faces away from the upper shell 1.2, has a toothed structure (toothing) 5.1, which increases the coefficient of friction between the disc 5 and a connected bodywork part, for example a longitudinal beam 6 of the bodywork. In contrast thereto, the side of the toothed disc 5 which abuts the upper shell 1.2 is preferably substantially smooth (cf. FIGS. 2 and 3).

The internal diameter of the toothed disc 5 corresponds to the internal diameter of the cylindrical sleeve portion 4.2 or is slightly smaller than said diameter. The external diameter of the toothed disc 5 may be variable. In particular, the external diameter of the toothed disc 5 may be selected to be as large as possible in order to achieve a correspondingly large or long weld seam on the groove 7 defined by the upper shell 1.2 and the outer circumference of the toothed disc 5. As a result, the welded joint of the toothed disc 5 has a higher strength than weld seams having a smaller diameter.

The size of the tooth contact surface is also variable. The external diameter of the toothed front side of the toothed disc 5 may therefore be the same size, larger or smaller than its external diameter on the side which abuts the upper shell 1.2. In the embodiment shown, the external diameter of the toothed disc 5 is smaller on its toothed front side than its external diameter on the side which abuts the upper shell 1.2. In this case, the toothed disc 5 comprises an attachment flange 5.2 which abuts the upper shell 1.2 and defines a shoulder 5.3 which surrounds the toothed top side or front side of the toothed disc 5. The circumferential groove in the shoulder 5.3 is preferably rounded in a concave manner when viewed in cross section (cf. FIG. 3).

For rigidly connecting the subframe 1, the bodywork is provided with nuts 8, which are integrally bonded, preferably by welding, to the bodywork, for example to longitudinal beams 6 of the bodywork. FIG. 3 shows a portion of a longitudinal beam 6 of the bodywork which comprises a through-hole 6.1 having a nut 8 welded to the hole edge. The nut 8 is arranged on the side of the metal sheet of the longitudinal beam 6 which faces away from the contact surface of the toothed disc 5.

The subframe 1 is connected to the bodywork by means of screws 9 which are inserted through the bodywork connection sleeves 4 and are screwed into the allocated nuts 8 which are fastened to the longitudinal beams 6. Preferably, in this case a metal support sheet 10 may also be connected to the head 4.1 of the sleeve. The metal support sheet 10 comprises a through-hole 10.1 for this purpose, of which the diameter is greater than the shaft 9.1 of the screw 9 and smaller than the diameter of the screw head 9.2.

Figure 7:
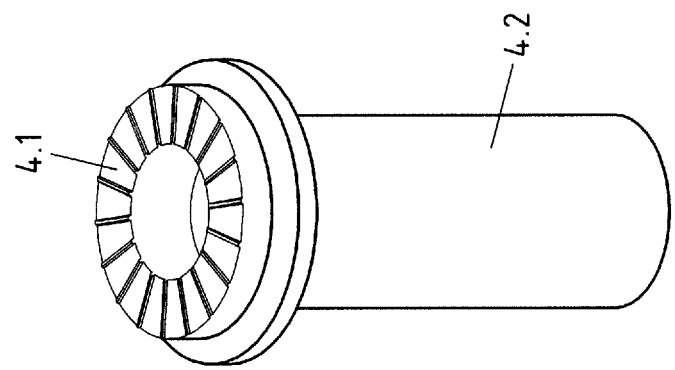
FIG. 7 is a top perspective view of a head (flange) shown along with a cylindrical sleeve portion according to one embodiment.
Figure 6:
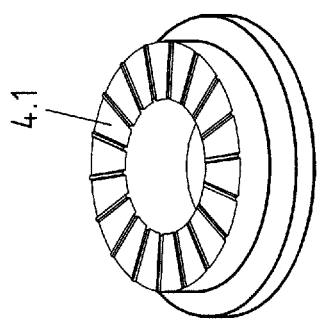
FIG. 6 is a top perspective view of a head (flange) of a sleeve according to one embodiment.

The front side of the sleeve head 4.1 which faces away from the metal support sheet 10 preferably also comprises a toothed structure (toothing) which increases the coefficient of friction between the sleeve head 4.1 and the metal support sheet 10 (see FIGS. 6-7). The side of the sleeve head (flange) 4.1 which abuts the upper shell 1.1 is, however, substantially smooth.

The external diameter of the sleeve head 4.1 may also be variable. In particular, the external diameter thereof may be selected to be as large as possible in order to achieve a correspondingly large or long weld seam on the groove 11 defined by the lower shell 1.1 and the circumference of the sleeve head 4.1.

The size of the front side of the sleeve head 4.1 which faces the metal support sheet 10 is also variable. Therefore, the external diameter of the sleeve head 4.1 on its front side may be the same size, larger or smaller than its outer diameter on the side which abuts the lower shell 1.1. In the embodiment shown, the external diameter of the sleeve head 4.1 is smaller on its front side than its outer diameter on the side which abuts the lower shell 1.1. In this case, the sleeve head 4.1 comprises an attachment flange 4.11 which abuts the lower shell 1.1 and defines a shoulder 4.3 which surrounds the side face. The circumferential groove in the shoulder 4.3 is preferably rounded in a concave manner when viewed in cross section (cf. FIG. 3).

The upper shell 1.2 is clamped between the toothed disc 5 and the bodywork connection sleeve 4 when the screw 9 is tightened.

The toothed disc 5 is preferably made of a steel material which is harder than the bodywork material. The bodywork and/or its longitudinal beams 6 may consist of high-strength steel material, for example of dual-phase steel of the DP 550 or DP 600 type. The metal support sheet 10 may, however, consist of non-hardened steel, for example of steel of the St 53 type. The bodywork connection sleeve 4, in particular its head 4.1, which is preferably a toothed head 4.1, is made of a steel material which is harder than the material of the metal support sheet 10. The material of the bodywork connection sleeve 4 must not, however, be as hard as the material of the separately produced toothed disc 5. Preferably, the material of the bodywork connection sleeve 4 is softer than the material of the separately produced toothed disc 5.

Figure 4:
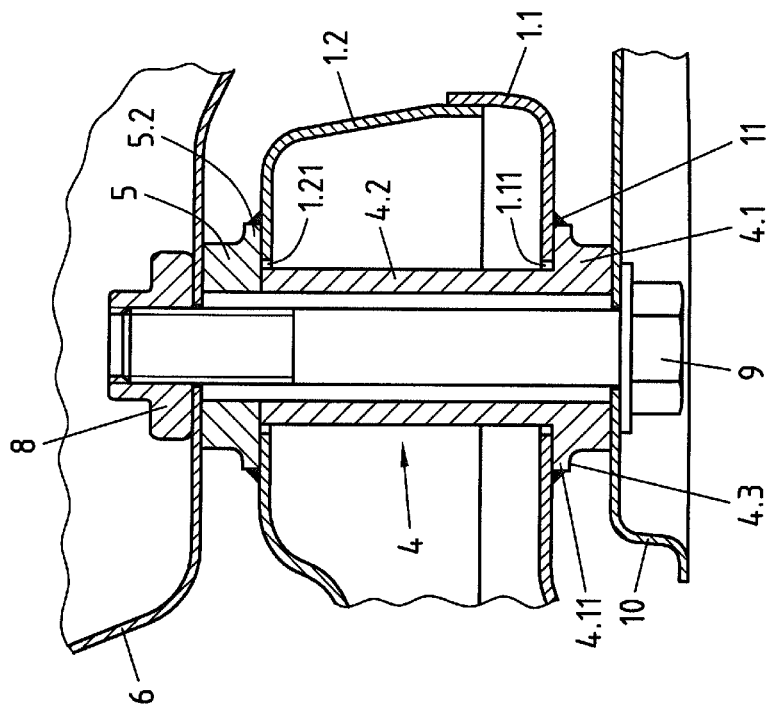
FIG. 4 is a vertical sectional view of a portion of a front axle subframe according to a second embodiment, connected to a longitudinal beam of the bodywork and to a metal support sheet.

The embodiment shown in FIG. 4 differs from the example shown in FIG. 3 in that the annular disc 4.1 and the bodywork connection sleeve 4 are produced separately from each other and are not integrally bonded to each other. The bodywork connection sleeve 4 is attached to the through-hole 1.11 at its end which faces the lower shell 1.1. For this purpose, the end of the sleeve 4 may for example be welded to the inside of the lower shell 1.1. Alternatively, the bodywork connection sleeve 4 may also be attached to the through-hole 1.11 by stud-shaped raised portions being provided next to the through-hole 1.11, for example by build-up welding, which raised portions secure the sleeve 4, which is arranged, preferably clamped, between the lower shell 1.1 and the upper shell 1.2, against being laterally displaced relative to the through-hole 1.11. The annular disc 4.1 is preferably formed as a toothed disc and, if applicable, has toothing (toothed structure) on its front side which faces away from the lower shell 1.1. The face of the disc 4.1 which abuts the lower shell 1.1 is, however, preferably substantially smooth.

Figure 5:
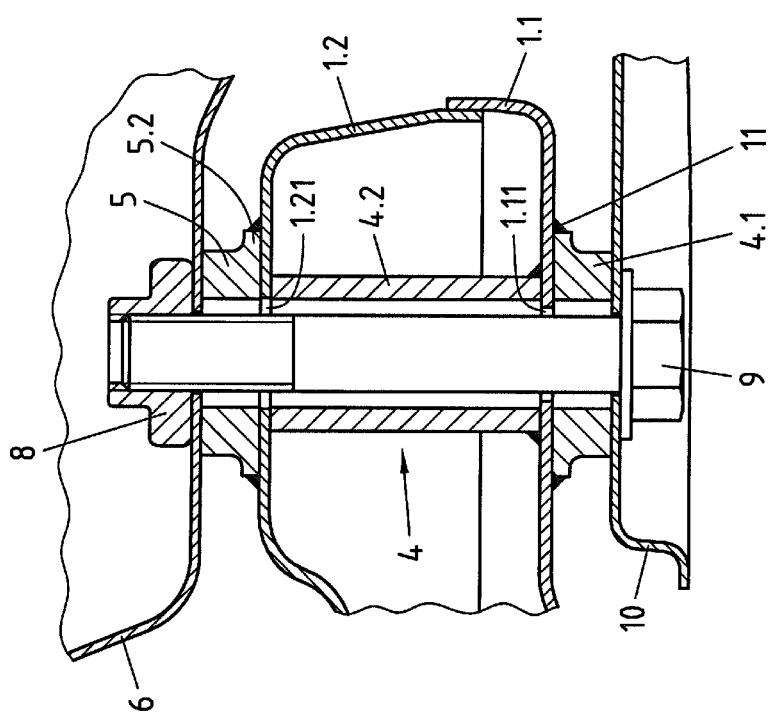
FIG. 5 is a vertical sectional view of a portion of a front axle subframe according to a third embodiment, connected to a longitudinal beam of the bodywork and to a metal support sheet.

The embodiment shown in FIG. 5 differs from the embodiment in FIG. 3 in that the through-hole 1.21 in the second shell element 1.2 is selected to be large enough for the bodywork connection sleeve 4 to directly contact the toothed disc 5.

The configuration of the invention is not restricted to the embodiments shown in the drawings. Rather, numerous variants are conceivable which make use of the invention set out in the accompanying claims, even if they differ in design from the example shown.

The invention claimed is:

1. A subframe for a motor vehicle, in particular a front axle subframe, comprising a first shell element and a second shell element which is rigidly connected to the first shell element and defines a cavity therewith, and comprising at least one bodywork connection sleeve for inserting a screw therethrough, the bodywork connection sleeve being directly attached at one of its ends to a through-hole in the first shell element and extending within the cavity towards a through-hole in the second shell element, wherein an annular disc is allocated to the attached end of the bodywork connection sleeve, which disc projects radially relative to the outer surface of the sleeve, is arranged on the outside of the first shell element and is integrally bonded thereto, and wherein a toothed disc produced separately from the bodywork connection sleeve is arranged on the outside on the through-hole in the second shell element, which the other end of the bodywork connection sleeve faces, which toothed disc has an external diameter which is greater than an internal diameter of the through-hole in the second shell element, and is integrally bonded to the second shell element.

2. The subframe according to claim 1, wherein the annular disc is integrally bonded or connected in one piece to the bodywork connection sleeve.

3. The subframe according to claim 1, wherein the bodywork connection sleeve or the annular disc is made of a different material, preferably steel, to the separately produced toothed disc.

4. The subframe according to claim 1, wherein the separately produced toothed disc is made of a harder material than the bodywork connection sleeve or the annular disc.

5. The subframe according to claim 1, wherein the separately produced toothed disc has, at least on its toothed front side or top side, a greater external diameter than the disc, which is allocated to the attached end of the bodywork connection sleeve, on its front side which faces away from the bodywork connection sleeve.

6. The subframe according to claim 1, wherein the separately produced toothed disc has an external diameter that is at least 1.4 times, preferably at least 1.5 times, greater than the smallest external diameter of the bodywork connection sleeve.

7. The subframe according to claim 1, wherein the disc allocated to the attached end of the bodywork connection sleeve comprises an attachment flange which abuts the first shell element and defines a shoulder that surrounds the front side of the disc.

8. The subframe according to claim 7, wherein the attachment flange has an external diameter that is at least 1.4 times, preferably at least 1.5 times, greater than the smallest external diameter of the bodywork connection sleeve.

9. The subframe according to claim 1, wherein the separately produced toothed disc comprises an attachment flange which abuts the second shell element and defines a shoulder that surrounds the toothed top side or front side of the toothed disc.

10. The subframe according to claim 9, wherein the attachment flange of the toothed disc has an external diameter that is at least 1.1 times, preferably at least 1.2 times, greater than the smallest external diameter of the toothed disc.

11. The subframe according to claim 1, wherein by tightening the insertable screw, the second shell element can be clamped between the separately produced toothed disc and the bodywork connection sleeve.

12. The subframe according to claim 1, further comprising a lower shell and an upper shell that is rigidly connected thereto, the first shell element being the lower shell and the second shell element being the upper shell of the subframe.

13. The subframe according to claim 1, wherein the disc allocated to the attached end of the bodywork connection sleeve has a toothed front side.

14. A bodywork comprising the subframe according to claim 1, wherein the separately produced toothed disc has a greater hardness than the portion of the bodywork connected thereto.

15. The bodywork according to claim 14, wherein the disc allocated to the attached end of the bodywork connection sleeve has a greater hardness than a bodywork panel connected thereto.

* * * * *